United States Patent
Franke et al.

(10) Patent No.: US 11,874,777 B2
(45) Date of Patent: Jan. 16, 2024

(54) SECURE COMMUNICATION OF VIRTUAL MACHINE ENCRYPTED MEMORY

(71) Applicant: INTERNATIONAL BUSINESS MACHINES CORPORATION, Armonk, NY (US)

(72) Inventors: Hubertus Franke, Cortlandt Manor, NY (US); Christoph Raisch, Gerlingen (DE); Bulent Abali, Tenafly, NJ (US); Marco Kraemer, Sindelfingen (DE)

(73) Assignee: International Business Machines Corporation, Armonk, NY (US)

( * ) Notice: Subject to any disclaimer, the term of this patent is extended or adjusted under 35 U.S.C. 154(b) by 14 days.

(21) Appl. No.: 17/644,651

(22) Filed: Dec. 16, 2021

(65) Prior Publication Data

US 2023/0195653 A1 Jun. 22, 2023

(51) Int. Cl.
*G06F 12/00* (2006.01)
*G06F 12/14* (2006.01)
(Continued)

(52) U.S. Cl.
CPC ...... *G06F 12/1408* (2013.01); *G06F 9/45558* (2013.01); *G06F 12/1054* (2013.01);
(Continued)

(58) Field of Classification Search
CPC .............. G06F 12/1408; G06F 9/45558; G06F 12/1054; G06F 12/1063; G06F 12/1433;
(Continued)

(56) References Cited

U.S. PATENT DOCUMENTS

| 8,462,780 B2 | 6/2013 | Pradeep |
| 10,102,399 B2 | 10/2018 | Veugen |

(Continued)

FOREIGN PATENT DOCUMENTS

| CN | 105830082 A | 8/2016 |
| CN | 108370382 A | 8/2018 |

(Continued)

OTHER PUBLICATIONS

Aslam, Mudassar. "TCG Based Approach for Secure Management of Virtualized Platforms State-ofthe-art ( Jun. 5, 2010 )." (2010). https://www.researchgate.net/publication/277836694_TCG_based_approach_for_secure_management_of_virtualized_platforms_state-of-the-art.

(Continued)

*Primary Examiner* — Arvind Talukdar
(74) *Attorney, Agent, or Firm* — Nathan M. Rau

(57) ABSTRACT

An apparatus, a method, and a computer program product are provided that provide confidential computing on virtual machines by securing input/output operations between a virtual machine and a device. The method includes receiving an input/output (I/O) transaction from an I/O device requesting data stored memory from a virtual machine. The I/O transaction includes a virtual memory address and a bus device function. The method also includes associating the I/O transaction with a key slot associated with the virtual machine and retrieving, using the key slot, an encryption key used to encrypt and decrypt the data. The method further includes retrieving the data located at a physical memory address in physical memory relating to the virtual memory address of the data being requested and decrypting, during a read operation, the data using the encryption key for I/O transmission. The method also includes transmitting the decrypted data to the I/O device.

20 Claims, 8 Drawing Sheets

(51) Int. Cl.
  *G06F 12/1045* (2016.01)
  *G06F 13/16* (2006.01)
  *G06F 9/455* (2018.01)

(52) U.S. Cl.
  CPC ........ *G06F 12/1063* (2013.01); *G06F 12/145* (2013.01); *G06F 12/1433* (2013.01); *G06F 12/1466* (2013.01); *G06F 13/161* (2013.01); *G06F 13/1668* (2013.01); *G06F 2009/45583* (2013.01)

(58) Field of Classification Search
  CPC .. G06F 12/145; G06F 12/1466; G06F 13/161; G06F 13/1668; G06F 2009/45583
  See application file for complete search history.

(56) References Cited

U.S. PATENT DOCUMENTS

| | | | |
|---|---|---|---|
| 10,176,122 | B2 | 1/2019 | Kaplan |
| 10,310,990 | B2 | 6/2019 | Shaw |
| 10,824,349 | B1 | 11/2020 | Chan |
| 2009/0249059 | A1 | 10/2009 | Asano |
| 2018/0107608 | A1 | 4/2018 | Kaplan |
| 2019/0102323 | A1 | 4/2019 | Durham et al. |
| 2021/0117360 | A1* | 4/2021 | Kutch ................. G06F 12/0802 |
| 2022/0100911 | A1* | 3/2022 | Trikalinou .............. G06F 21/78 |
| 2022/0197825 | A1* | 6/2022 | Dewan ................ G06F 12/0238 |

FOREIGN PATENT DOCUMENTS

| | | |
|---|---|---|
| CN | 110083550 A | 8/2019 |
| CN | 110557254 A | 12/2019 |
| JP | 2009246801 A | 10/2009 |

OTHER PUBLICATIONS

Dunn et al. "Eternal sunshine of the spotless machine: Protecting privacy with ephemeral channels." 10th {USENIX} Symposium on Operating Systems Design and Implementation ({OSDI} 12). 2012.

Encryption on handheld device with remote server support, IP.com Publication date Sep. 7, 2011, IPCOM000210519D, https://priorart.ip.com/IPCOM/000210519.

Intel Archictecture Memory Encryption Technologies—Specification, Apr. 2021, Rev. 1.3, https://software.intel.com/content/dam/develop/external/us/en/documents-tps/multi-key-total-memory-encryption-spec.pdf, Retrieved from internet on Oct. 13, 2021.

List of IBM Patents or Patent Applications Treated as Related.

Mengyuan Li, Yinqian Zhang, Zhiqiang Lin, and Yan Solihin. 2019. Exploiting unprotected I/O operations in AMD's secure encrypted virtualization. In Proceedings of the 28th USENIX Conference on Security Symposium (SEC'19). Usenix Association, USA, 1257-1272. https://www.usenix.org/conference/usenixsecurity19/presentation/li-mengyuan.

Method and apparatus to encrypt communication channel between keyboard and computer, IP.com Publication date Feb. 12, 2012, IPCOM000214678D, https://priorart.ip.com/IPCOM/000214678.

Morbitzer, M., Huber, M., Horsch, J., & Wessel, S. (2018). SEVered: Subverting AMD's Virtual Machine Encryption. Proceedings of the 11th European Workshop on Systems Security. https://www.semanticscholar.org/paper/SEVered%BA-Subverting-AMD's-Virtual-Machine-Morbitzer-Huber/674aba04d45a52f865de95b1e32ee6d756350309#citing-papers.

Paladi, Nicolae, Christian Gehrmann and Fredric Morenius. "Domain-Based Storage Protection (DBSP) in Public Infrastructure Clouds." NordSec (2013). https://link.springer.com/chapter/10.1007%2F978-3-642-41488-6_19.

System and Method to do Policy Based Encryption for Cloud Based Applications, IP.com Publication date Nov. 19, 2013, IPCOM000232580D, https://priorart.ip.com/IPCOM/000232580.

T. Isenstierna and S. Popovic, 'Computer systems in airborne radar☐: Virtualization and load balancing of nodes', Dissertation, 2019. ). Faculty of Computing, Blekinge Institute of Technology, 371 79 Karlskrona, Sweden.

Welcome to Developer Central, AMD Developer Central, https://developer.amd.com/, Retrieved from internet on Oct. 13, 2021.

Xia et al. "Virtual WiFi: Bring Virtualization from Wired to Wireless" VEE'11, Mar. 9-11, 2011, Newport Beach, California, USA.

Xiang et al. "Reducing latency in virtual machines: Enabling tactile Internet for human-machine co-working." IEEE Journal on Selected Areas in Communications 37.5 (2019): 1098-1116.

Yuxin Ren, Guyue Liu, Vlad Nitu, Wenyuan Shao, Riley Kennedy, Gabriel Parmer, Timothy Wood, and Alain Tchana. 2020. Fine-grained isolation for scalable, dynamic, multi-tenant edge clouds. Proceedings of the 2020 USENIX Conference on Usenix Annual Technical Conference. Article 64, 927-942. https://dl.acm.org/doi/10.5555/3489146.3489210.

Notification of Transmittal of the International Search Report and the Written Opinion of the International Searching Authority, or the Declaration, International Application No. PCT/CN2022/134533, dated Jan. 13, 2023, 8 pgs.

* cited by examiner

SECURE COMMUNICATION OF VIRTUAL MACHINE ENCRYPTED MEMORY

BACKGROUND

The present disclosure relates to virtualization, and more specifically, to confidential computing on virtual machines by securing input/output operations between a virtual machine and a device.

Virtualization uses software to create an abstraction layer over computer hardware that allows the hardware elements of a single computer (e.g., processors, memory, storage, etc.) to be divided into multiple virtual computers, commonly called virtual machines. Each virtual machine can run its own operating system and can behave like an independent computer, even though it is running on just a portion of the actual underlying computer hardware.

Confidential computing refers to an initiative focused on ensuring data is secure while in use. Techniques are used to enable encrypted data to be processed in memory while lowering the risk of exposing it to other components or devices on the system. These efforts attempt to reduce the potential for sensitive data to be exposed while also offering a higher degree of control to the user.

SUMMARY

Embodiments of the present disclosure include a method for providing confidential computing on virtual machines by securing input/output operations between a virtual machine and a device. The method includes receiving an input/output (I/O) transaction from an I/O device requesting data stored memory from a virtual machine. The I/O transaction includes a virtual memory address and a bus device function. The method also includes associating the I/O transaction with a key slot associated with the virtual machine and retrieving, using the key slot, an encryption key used to encrypt and decrypt the data. The method further includes retrieving the data located at a physical memory address in physical memory relating to the virtual memory address of the data being requested and decrypting, during a read operation, the data using the encryption key for I/O transmission. The method also includes transmitting the decrypted data to the I/O device, encrypting, during a write operation, the data using the encryption key for I/O transmission, and storing the encrypted data in the physical memory.

Additional embodiments of the present disclosure include a computer program product for providing confidential computing on virtual machines by securing input/output operations between a virtual machine and a device, a computer-readable storage medium having a computer-readable program stored therein, wherein the computer-readable program when executed on a computing device, causes the computing device to receive an input/output (I/O) transaction from an I/O device requesting data stored memory from a virtual machine. The I/O transaction includes a virtual memory address and a bus device function. The computer program also causes the computing device to associate the I/O transaction with a key slot associated with the virtual machine and retrieve, using the key slot, an encryption key used to encrypt and decrypt the data. The computer program also causes the computing device to retrieve the data located at a physical memory address in physical memory relating to the virtual memory address of the data being requested and decrypt, during a read operation, the data using the encryption key for I/O transmission. The computer program also causes the computing device to transmit the decrypted data to the I/O device, encrypt, during a write operation, the data using the encryption key for I/O transmission, and store the encrypted data in the physical memory.

Further embodiments of the present disclosure include an apparatus for providing confidential computing on virtual machines by securing input/output operations between a virtual machine and a device. The apparatus includes a memory, a processor, local data storage having stored thereon computer-executable code. The computer-executable code includes the program instruction executable by a processor to cause the processor to perform the method described above. The present summary is not intended to illustrate each aspect of, every implementation of, and/or every embodiment of the present disclosure.

BRIEF DESCRIPTION OF THE DRAWINGS

These and other features, aspects, and advantages of the embodiments of the disclosure will become better understood with regard to the following description, appended claims, and accompanying drawings where:

Figure 1:
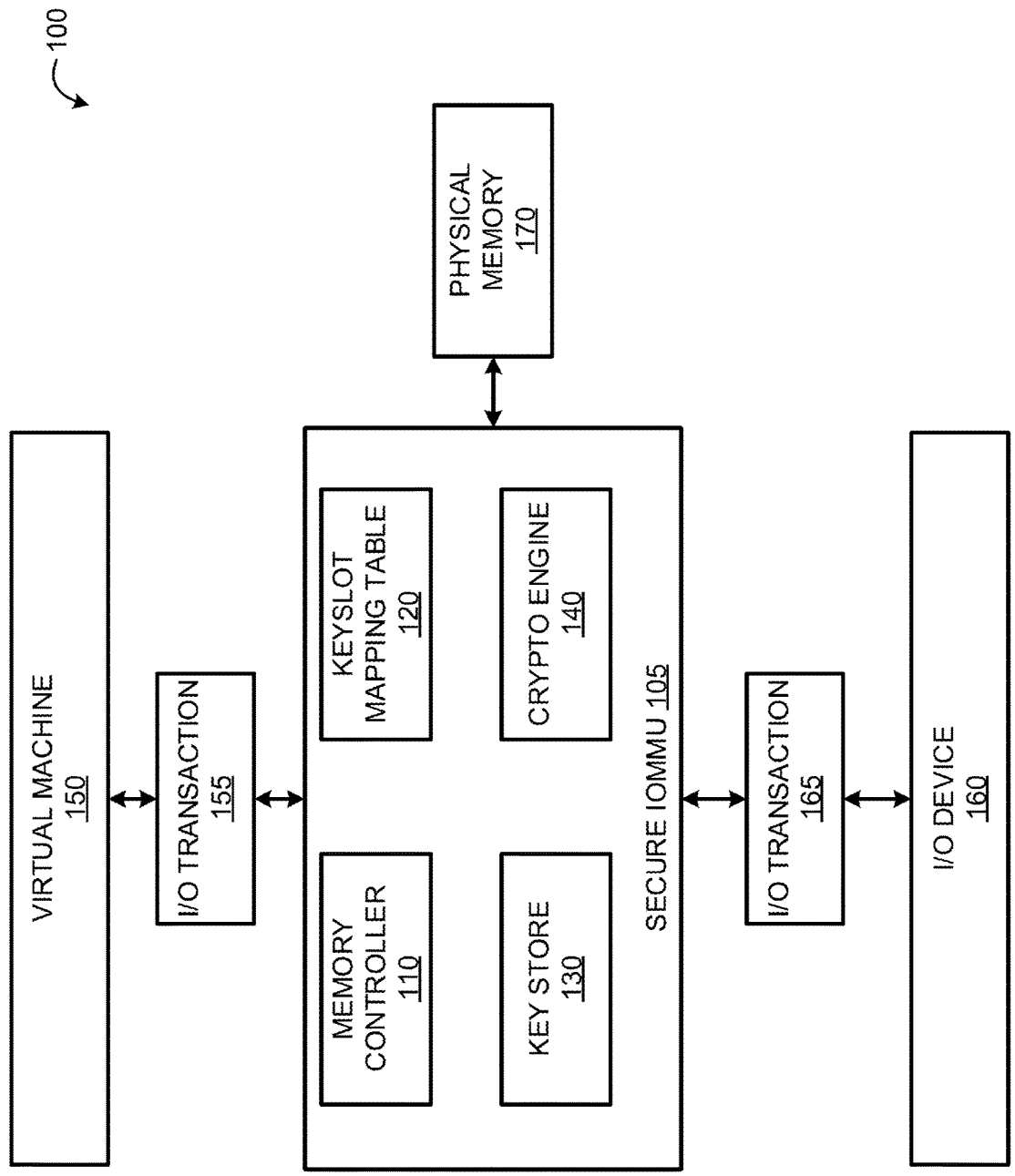
FIG. 1 is a block diagram illustrating an operation of the primary operational elements of an improved computing tool used by one or more embodiments of the present disclosure.

While the present disclosure is amenable to various modifications and alternative forms, specifics thereof have been shown by way of example in the drawings and will be described in detail. It should be understood, however, that the intention is not to limit the particular embodiments described. On the contrary, the intention is to cover all modifications, equivalents, and alternatives falling within the scope of the present disclosure. Like reference numerals are used to designate like parts in the accompanying drawings.

DETAILED DESCRIPTION

The present disclosure relates to virtualization, and more specifically, to confidential computing on virtual machines by securing input/output operations between a virtual machine and a device. While the present disclosure is not necessarily limited to such applications, various aspects of the disclosure may be appreciated through a discussion of various examples using this context.

A current trend in computing is the placement of data and enterprise workloads in the cloud by utilizing hosting services provided by cloud server providers (CSPs). As a result of the hosting of the data and enterprise workloads in the cloud, customers (e.g., guests) of the CSPs are requesting better security and isolation solutions for their workloads. In particular, customers seek solutions that enable the operation of CSP-provided software outside of a Trusted Computing Base (TCB) of the guest's software. The TCB of a system refers to a set of hardware, firmware, and/or software components that have the ability to influence the trust for the overall operation of the system. Accordingly, for example, a virtual machine monitor (VMM or hypervisor) establishes and controls a virtual machine (VM), which executes the guest software. Guests, therefore, want the components of the VMM to operate outside of the guest's TCB. If the VMM is executed as software on top of the hardware of a virtualized server, the VMM is considered untrusted software.

In furtherance of data security in CSP-based systems, various techniques have been employed to protect sensitive data residing in regions of memory, e.g., of CSP servers. Some system processors provide cryptographic mechanisms for encryption, integrity, and replay protection. Memory encryption protects the confidentiality of memory-resident data. For example, total memory encryption (TME) may encrypt data that is moving from a processor core to memory and may decrypt the encrypted data on its way back to the processor core. Additionally, the CSP server may support the use of multiple encryption keys, e.g., a different key for each secure domain serviced by the server, which could be dozens or thousands of domains. Accordingly, a TME engine may be adapted to securely manage the use of multiple encryption keys as a multi-key TME (or MK-TME) engine, which may be referred to more generally herein as a cryptographic engine.

Memory virtualization in a majority of architectures is realized through a duality of page tables. The host (e.g., CSP-based systems) treats the guest VM as an application that has an address space for which a page table provides the translation from the guest's physical memory address to the host's physical memory address. This is commonly referred to as a nested page table (nPT). The guest operating system provides a guest page table (gPT) for each of the applications it is running. A guest application with a guest virtual memory address (gVA) can first be translated through the gPT to obtain its guest physical memory address (gPA), which then can be translated to the nPT to the host physical memory address (hPA) that is presented to the memory controller.

Typically, an input-output memory management unit (IOMMU) is utilized to protect a host system from rogue devices. A rogue device can be a device or peripheral that attempts direct memory accesses (DMA) without authorization. The IOMMUs also handle input/output (I/O) operations where I/O operations are given addresses of I/O buffer addresses. When the addresses are presented on the bus, the address is translated by the IOMMU prior to being presented to the memory controller.

For encrypted memory, encryption keys are embedded into the memory controller and are managed either explicitly or implicitly by the hypervisor. Memory accesses in the memory controller are tagged by the hardware using an address-space identifier (ASID) of the currently executing context (e.g., the VM or the host), which can then be used as a selector for the encryption key. As such, the host does not have access to the guest virtual memory due to it not having direct access to the encryption key.

Limitations on confidential computing on a VM remain, however, as data has to be unencrypted for I/O operations with a device. Devices include, but are not limited to, modems, network interface cards (NIC), sound cards, keyboards, mice, hard drives, flash drives, sound cards, other peripheral component interconnect (PCI) devices, and the like. When dealing with memory, a device must be able to read and write data as well as inspect packet headers to take appropriate routing actions. The data is required to be decrypted on a device DMA read operation or encrypted on a device DMA write operation. In order to facilitate the encryption and decryption operations for the devices, a bounce buffer is utilized that is accessible by both the guest and the host and encrypted with the host key. While memory can be encrypted on a per VM basis or per-host basis, I/O operations only have one translation layer using the bounce buffer. This limits devices, such as single-root I/O virtualization (SR-IOV) devices and prevents them from being fully utilized. The bounce buffer technique also does not provide support for passthrough devices.

SR-IOV capable devices can include logic to support the SR-IOV implementation by the I/O device. For example, the SR-IOV implementation can allow the I/O device to present itself as multiple, independent virtual devices implementing one or more virtualized backend drivers. For example, the SR-IOV capability can allow the I/O device to implement multiple virtual functions, wherein each virtual function can emulate the functionality of a backend driver or by an interface compatible with a virtualized backend driver.

As such, the ever-increasing availability of SRIOV devices cannot be fully utilized, and device passthrough is prohibited when memory is encrypted. When a DMA operation occurs, there is no way to associate the operation other than with the slot of origin or destination. Current solutions involve additional I/O overhead, which increases variability due to involving additional mechanisms such as a QEMU hypervisor in each I/O operation. Being able to utilize SRIOV devices removes the hypervisor from the data path, thereby increasing the security to allow for confidential computing.

Embodiments of the present disclosure may overcome the above and other problems by providing mechanisms for secure DMA communication between devices and virtual machines. For each PCI transaction, a key slot is presented to the memory controller with which the memory access between the I/O device and a VM can occur. Encryption and decryption can be conducted when data is being transferred to and from the device. The key slot can be an identifier associated with an address space or virtual machine. Each key slot can have an associated encryption key stored in a protected keystore embedded in the memory controller. When data is fetched from memory, it can be decoded using that encryption key. Additionally, whenever data is being sent from the device to memory, the attached key slot can be used to retrieve the associated encryption key to encrypt the data being sent to memory.

More specifically, embodiments of the disclosure extend the IOMMU functions to create selectors for which encryption keys can be accessed to access encrypted memory of a virtual machine when memory traffic is initiated with an I/O device (e.g., a PCI device). A virtual IOMMU can be associated with an encrypted virtual machine, and an SR-IOV virtual function dedicated to the virtual machine is tagged with an address space identifier (ASID) (e.g., a key slot) of the virtual machine. The ASID can be utilized to retrieve the stored encryption key of the encrypted virtual machine in the memory controller. Whenever an I/O transaction occurs, the ASID is utilized to encrypt and decrypt the transmission.

Whenever a PCI transaction occurs, virtual function information is presented as part of the transaction. In particular, a bus transaction identifies a bus device function (BDF) and the virtual memory address. Embodiments expand the general I/O translation subsystem with a key slot identifier and supply the mapped physical memory address together with the key slot to the memory controller. Whenever a transaction occurs, using the BDF and virtual memory address, the key slot can be obtained. That information can be provided to the memory controller. Using the key slot and the mapped physical memory address, the memory controller can retrieve the encryption key associated with the virtual machine to either encrypt or decrypt the I/O.

In some embodiments, the IOMMU subsystem is augmented with a BDF to key slot mapping table. The IOMMU can continue to supply the physical memory address as it was entered into the IOMMU. In addition, the BDF is mapped to the additional key slot mapping table to retrieve the key slot. The physical memory address and the key slot can be provided to the memory controller to retrieve the memory and perform decryption/encryptions operations. Any updates to the key slot mapping table can be supported through a privileged mechanism/instruction that can be executed by the hypervisor. These updates can include but are not limited to assigning a BDF to a VM and removing a BDF from a VM.

In some embodiments, upon creation of a VM, or when an IOMMU entry is created, a key slot is tagged with a BDF associated with an I/O device. When an IOMMU lookup is conducted using the BDF and virtual memory address, the key slot, and the physical memory address are returned together. The entry can be created by the guest VM or by privileged software and can be tagged with the key slot that is to be utilized. Adding the key slot into the IOMMU lookup table can be accomplished by first identifying the VM calling the table using, for example, a protected processor register. Once identified, the associated key slot can be returned and added to the IOMMU translation table for a given BDF and virtual memory address.

In some embodiments, virtual IOMMU structures are used with each encrypted VM that has a passthrough I/O device associated with it. The virtual IOMMU structure can be encrypted with the guest encryption key of its associated VM. The virtual IOMMU can be entirely programmed by the guest VM and mapped into guest memory, thereby encrypting it with the guest encryption key.

FIG. 1 is a block diagram illustrating a virtualization computing environment 100 for confidential computing on virtual machines by securing input/output operations between a virtual machine and a device, in accordance with embodiments of the present disclosure. The virtualization computing environment 100 includes a secure IOMMU 105, a virtual machine 150, an I/O device 160, and physical memory 170. The secure memory controller 105 includes a memory controller 110, a key slot mapping table 120, a key store 130, and a crypto engine 140. For purposes of the present description, it will be assumed that the illustrative embodiments are being implemented as part of a virtualization mechanism and specifically on a host computing system utilizing a hypervisor to spawn and operate virtual machines. However, this is only one possible implementation and is not intended to be limiting on the present disclosure. Other implementations in which virtual machines and/or containers are utilized may also be used without departing from the spirit and scope of the present disclosure.

The secure IOMMU 105 is a component of the virtualization computing environment 100 configured to translate device-visible virtual memory addresses to physical memory addresses and to connect the I/O device 160 to a DMA bus with the virtual machine 150. The secure IOMMU 105 can provide functionalities such as DMA remapping functionality that manipulates address translations for the I/O device 160 and interrupt remapping functionality that route interrupts of the I/O device 160 to the corresponding virtual machine 150.

With regard to providing confidential computing between the virtual machine 150 and the I/O device 160, the secure IOMMU 105 is utilized, as shown in FIG. 1. The secure IOMMU 105 includes a memory controller 110 configured to manage the flow of data going to and from the physical memory 170 of a computer. The memory controller 110 can be a separate chip or integrated into another chip, such as being placed on the same die or as part of a microprocessor. The memory controller 110 contains logic necessary to read and write dynamic random-access memory (DRAM) located on the physical memory 170.

When performing an I/O operation, the virtual machine 150, and/or the I/O device 160 transmit an I/O transaction 155, 165. For instance, the I/O transaction 165 includes virtual function information, a bus device function, or BDF, and the virtual memory address location of the memory being accessed. The I/O transaction information is transmitted to the memory controller 110 that can translate the BDF and the virtual memory address into a physical memory address of where the memory is physically located in physical memory 170. Additionally, the I/O transaction 165 can include a key slot associated with the virtual machine 150 the I/O device 160 is communicating with. The key slot acts as an identifier for the virtual machine 150. The identifier also referred to as a key slot, can also be a virtual machine identifier, or a partition identifier.

In some embodiments, IOMMU entries are expanded to include the key slot. Upon creation of the virtual machine 150, the BDF associated with the I/O device 160 is tagged with the key slot of the virtual machine 150. Whenever an I/O transaction 165 occurs with the BDF and virtual memory address, the memory controller 110 can return the physical memory address and the corresponding key slot. The IOMMU entries can be created by the guest or by privileged software, and hardware can be utilized to tag the corresponding key slot. For example, the 'H_PUT_TCE' instruction can update the IOMMU lookup table by identifying the virtual machine calling the instruction, determining the corresponding key slot for the virtual machine, and by adding the key slot to the IOMMU translation table.

In some embodiments, instead of providing a means for directly manipulating the single physical IOMMU, virtual IOMMU structures are used with each encrypted VM that has a passthrough I/O device associated with it. The virtual IOMMU structure can be encrypted with the guest encryption key of its associated VM The virtual IOMMU can be entirely programmed by the guest VM and mapped into guest memory, thereby encrypting it with the guest encryption key. The BDF is utilized to identify the virtual IOMMU associated with the passthrough device to verify the memory access associated with the I/O transaction.

In order to maintain confidential computing between the I/O device 160 and the virtual machine 150, the encrypted memory being accessed requires decryption. Using the key slot, the memory controller 110 can reference the key slot mapping table 120 to retrieve the encryption key used by the virtual machine 150. The key slot mapping table 120 is a component of the secure IOMMU 105 configured to store a mapping between an identifier (e.g., the key slot) of the virtual machine 150 and its corresponding encryption key.

Using the key slot mapping table 120, the key store 130 can be accessed that securely stores the encryption key for the virtual machine 150. The memory controller 110 can utilize the encryption and crypto engine 140 to decrypt the memory being accessed by the I/O device.

The crypto engine 140 is a component of the secure IOMMU 105 configured as a cryptographic engine capable of conducting at least one cryptographic operation. The crypto engine can be part of a hardware unit like a controller, or it can be a hardware unit on its own, to supply cryptographic information. The cryptographic information includes, but is not limited to, encryption and decryption of I/O transmission between the virtual machine 150 and the I/O device 160.

The key store 130 is a component of the secure IOMMU 105 configured to store sensitive data, such as passwords, cryptographic keys, cryptographic certificates, and other types of sensitive data. In some embodiments, the key store 130 can be a sandboxed or private area of a data store (not shown) in the secure IOMMU 105. The key store 176 can be reserved by the host for use only by the secure IOMMU 105. In addition to storing cryptographic keys generated for the virtual machine 150, the key store 176 can also store other keys (e.g., public keys) generated by other applications or other virtual machines in operation by the host.

The crypto engine 140 can utilize the encryption key stored within the key store 130 to perform encryption/decryption operations on the I/O transmissions between the virtual machine 150 and the I/O device. Any encryption/decryption mechanism can be used to store data in a way where data is provided to memory and cannot be interpreted without a proper encryption/decryption of the data after retrieval from memory.

It is noted that FIG. 1 is intended to depict the major representative components of a virtualization computing environment 100. In some embodiments, however, individual components may have greater or lesser complexity than as represented in FIG. 1, components other than or in addition to those shown in FIG. 1 may be present, and the number, type, and configuration of such components may vary.

Figure 2:
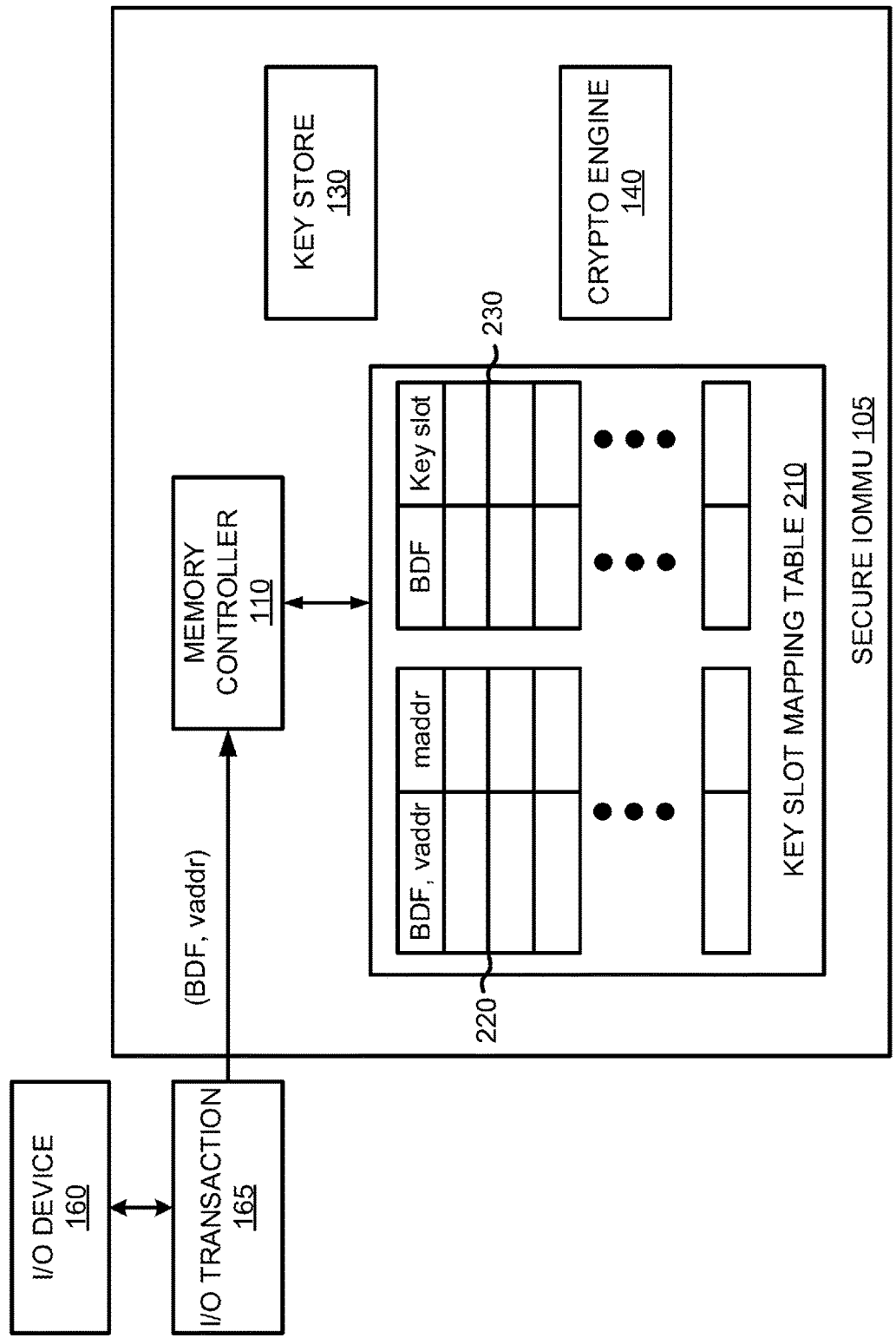
FIG. 2 is a block diagram illustrating a key slot mapping table with an additional mapping table used by one or more embodiments of the present disclosure.

FIG. 2 is a block diagram illustrating a key slot mapping table 210 with an additional mapping table utilized by the memory controller 110, in accordance with embodiments of the present disclosure. The key slot mapping table 210 includes a mapping table 220 of the BDF and virtual memory address to the physical memory address. The mapping table 220 can be the standard IOMMU address mapping mechanism that is used by the memory controller 110 during translations. The key slot mapping table 210 also includes a mapping table 230 of the BDF mapped to the corresponding key slot of the virtual machine 150.

When the I/O device 160 transmits an I/O transaction 165, the BDF and virtual memory address of the memory being accessed is provided to the secure IOMMU 105. Upon receiving the I/O transaction 165, the memory controller can utilize the key slot mapping table 210 to retrieve the corresponding physical memory address using the mapping table 220. In addition, the memory controller 110 can also retrieve the key slot using the mapping table 230. These operations can be performed in parallel upon receiving the I/O transaction 165. Depending on the type of I/O operation being performed, the memory controller 110 can either encrypt the physical memory to be stored by the virtual machine 150 or decrypt the physical memory for transmission to the I/O device 160.

Entries and updates to the mapping table 220 can be handled according to the type of IOMMU being utilized as no change is required to the operation of memory translation and retrieval. In some embodiments, entries and updates to the mapping table 230 are supported by a privileged mechanism. The privileged mechanism can be executed by the hypervisor that include instructions such as assign the BDF to the virtual machine 150 and removing the BDF from the virtual machine 150.

Figure 3:
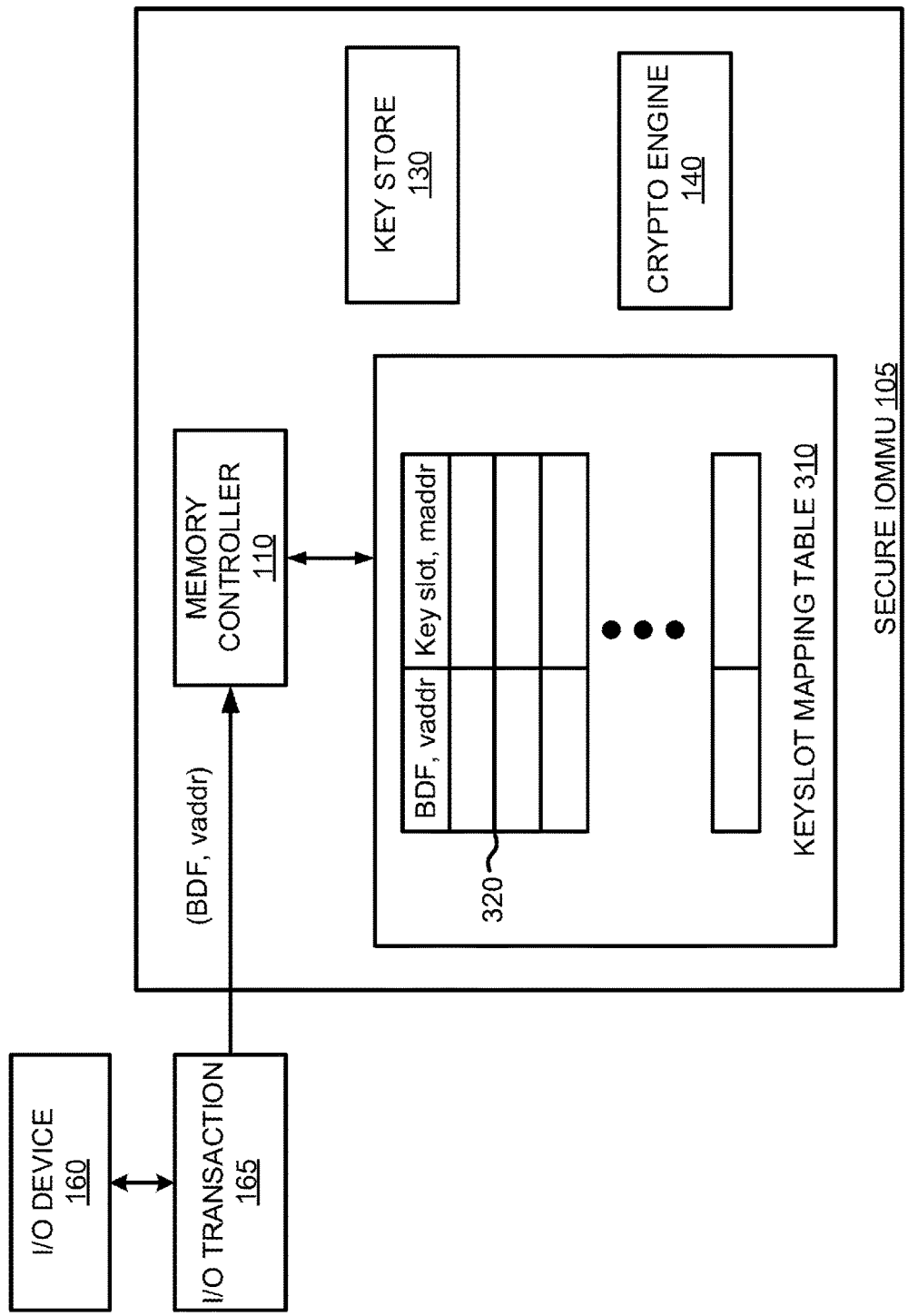
FIG. 3 is a block diagram illustrating a key slot mapping table with expanded entries that include a key slot and used by one or more embodiments of the present disclosure.

FIG. 3 is a block diagram illustrating a key slot mapping table 310 with expanded entries and utilized by the memory controller 110, in accordance with embodiments of the present disclosure. The key slot mapping table 310 includes an expanded mapping table 320 of the BDF and the virtual memory address to the physical memory address and the corresponding key slot.

Upon creation of the virtual machine 150, the BDF associated with the I/O device 160 is tagged with the key slot of the virtual machine 150. This operation can occur upon creation of the virtual machine 150, or when the I/O device 160 is a passthrough device, or when an IOMMU entry is created in the mapping table 310. Whenever an I/O transaction 165 occurs, the memory controller 110 perform an IOMMU lookup returns the physical memory address and the corresponding key slot.

IOMMU entries into the mapping table 310 can be performed by the virtual machine 150 or by privileged software that is tagged by secure hardware to provide the key slot to be utilized. In some embodiments, instructions to update the mapping table 310 by first identifying the virtual machine 150. Identifying the virtual machine 150 can be performed by instructions such 'H_PUT_TCE' and can be performed with a protected processor register. Additionally, the update also looks up the key slot associated with the identified virtual machine 150. Once retrieved, the update instruction adds the key slot to the expanded mapping table 320 for the given BDF and virtual memory address.

It should be noted that the key slot information is not available to software and the IOMMU 105 is encrypted with a host key. Additionally, the entries in the expanded mapping table 320 can be treated as privileged instruction and implemented by the hypervisor. Capacity limitations can be handled by the hypervisor or by secure hardware. For example, the key store can maintain a token count that is decremented upon making an entry into the expanded mapping table 320.

Figure 4:
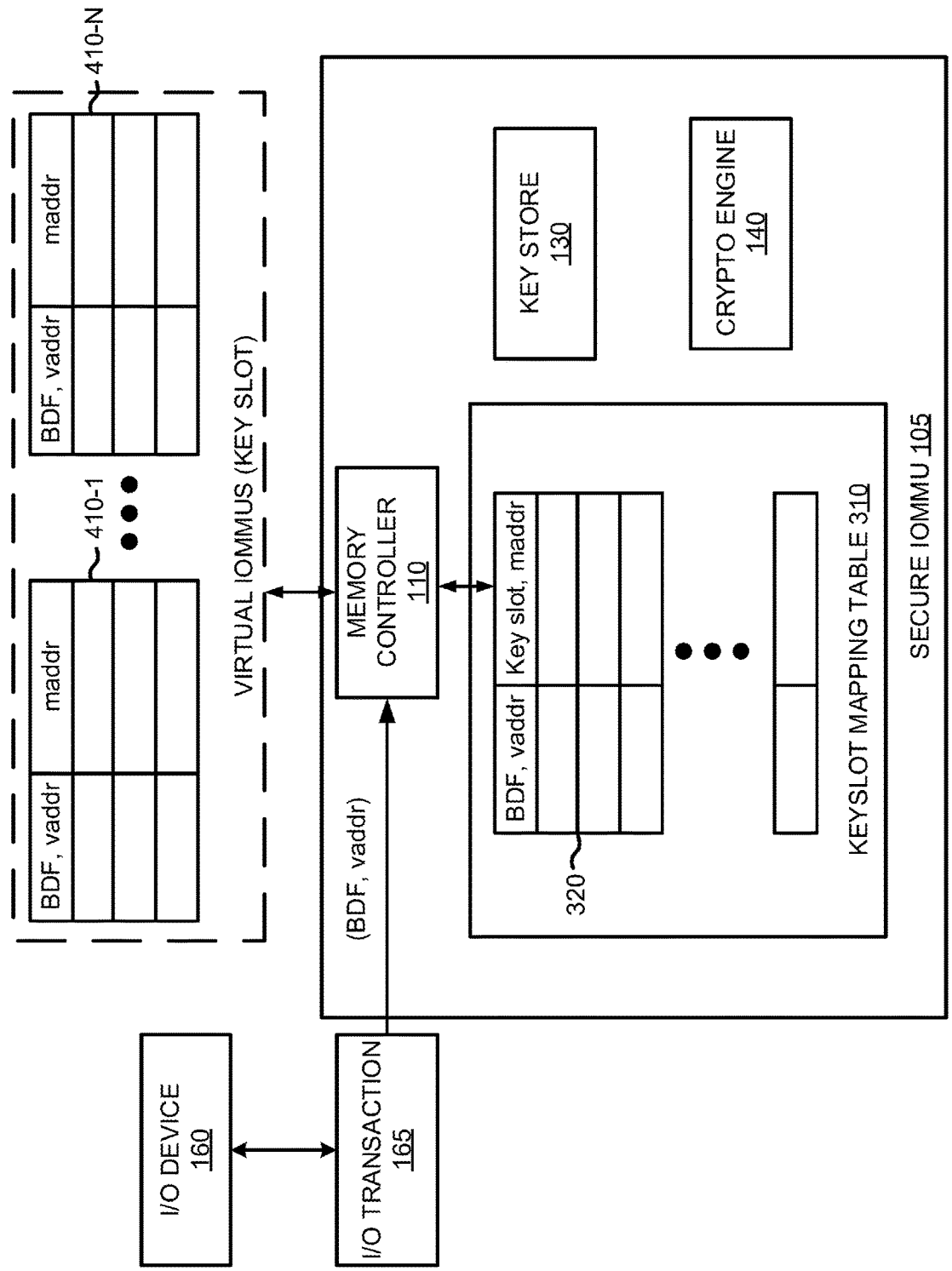
FIG. 4 is a block diagram illustrating a key slot mapping table utilizing virtual input/output memory mapping units and used by one or more embodiments of the present disclosure.

FIG. 4 is a block diagram illustrating a key slot mapping table 310 utilizing virtual IOMMU (vIOMMU) structures 410-1, 410-N (collectively "vIOMMU structures 410"), where N") where N is a variable integer representing any number of possible vIOMMU structures 410 and in accordance with embodiments of the present disclosure. At least one of the vIOMMU structures 410 is associated with the encrypted virtual machine 150 that also has an associated passthrough I/O device 160.

In some embodiments, the associated vIOMMU structure 410 resides in the encrypted memory of the virtual machine 150. The vIOMMU structure 410 can store the encryption key of the virtual machine 150 and can be used whenever an I/O transaction 165 requires a encryption/decryption operation. In order for the memory controller 110 to associate an I/O transaction 165 with the appropriate vIOMMU structure 410, a second mapping table can be implemented that maps the vIOMMU structure 410 to the associated BDF and key slot.

In some embodiments, the expanded mapping table 310 can be further expanded to also provide a point to the corresponding vIOMMU structure 410. For example, in addition to providing the key slot and the physical memory address, when the memory controller 110 performs an IOMMU lookup, it can return the physical memory address, the corresponding key slot, and the pointer to the vIOMMU 410 associated with the virtual machine 150.

During operation, the secure IOMMU 105 can be treated as a lookup cache and can be fed by the vIOMMU structures 410. When an I/O transaction 165 occurs, if the entry is available to the secure IOMMU 105, then the operation proceeds as previously described. However, if the entry is not available and a miss occurs, then the BDF can be utilized in the expanded mapping table 310 to retrieve the pointer to the vIOMMU 410 as previously described. In the vIOMMU structure 410, the BDF and virtual memory address are retrieved with the key slot of the vIOMMU structure 410. Hashing can be utilized to avoid searches and other possible security concerns. The BDF, the virtual memory address, the key slot, and the physical memory address can then be injected into the secure IOMMU 105 using caching techniques.

Thus, the illustrative embodiments provide mechanisms for confidential computing on virtual machines by securing input/output operations between a virtual machine and a device. Embodiments extend traditional IOMMUs to create selectors for which encryption keys can be used to access encrypted memory of the virtual machine 150. When memory traffic is initiated from an I/O device (e.g., an SRIOV device), the secure IOMMU 105 can decrypt the memory being accessed without the need for host to access the information. Moreover, the mechanisms of the illustrative embodiments may operate in conjunction with hypervisor systems and/or other virtualization computing systems to perform confidential computing between I/O devices performing direct memory accesses to virtual machines.

Figure 5:
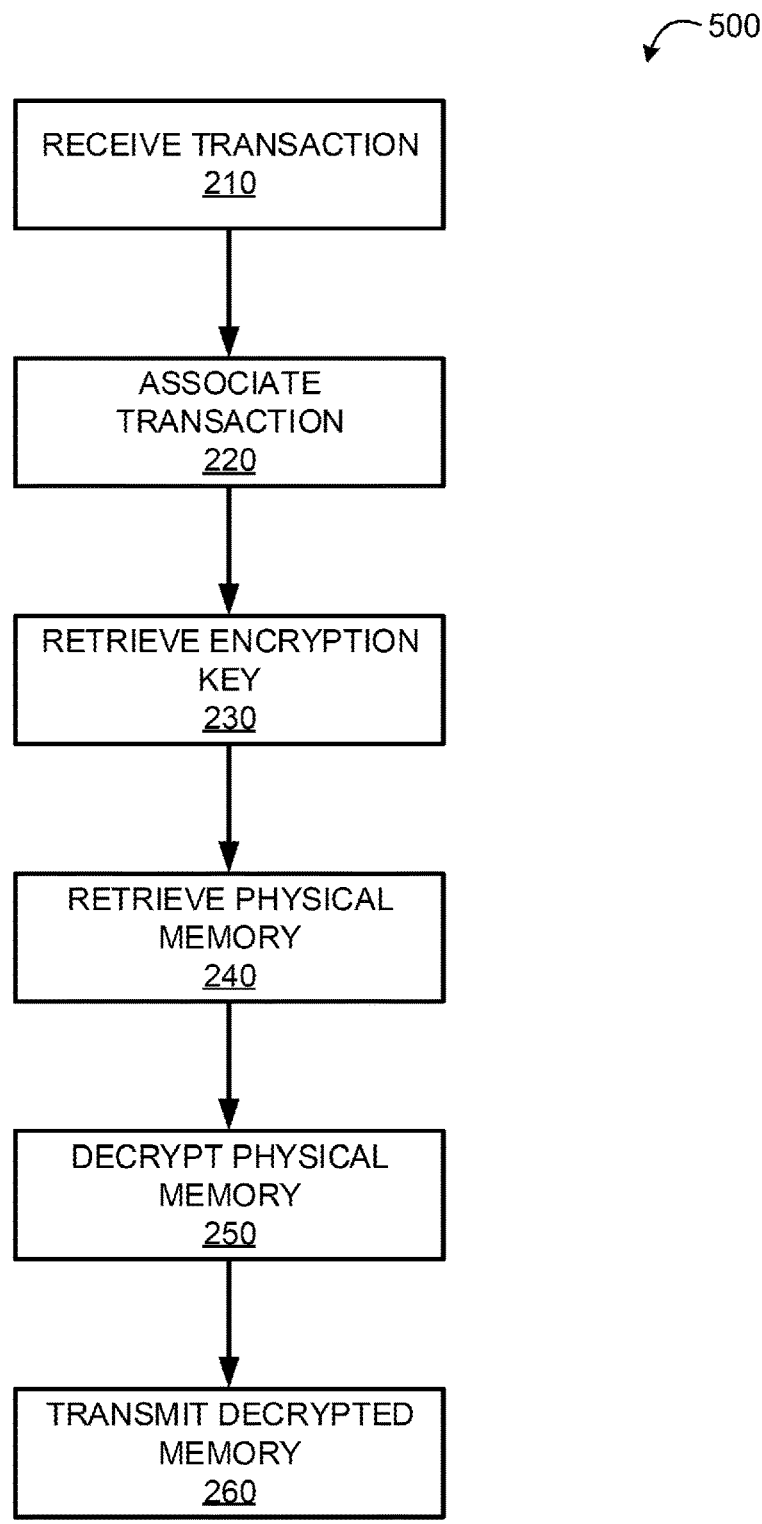
FIG. 5 is a flow diagram illustrating a process of providing confidential computing on virtual machines by securing input/output operations between a virtual machine and a device and performed in accordance with embodiments of the present disclosure.

FIG. 5 is a flow diagram illustrating a process 500 of providing confidential computing on virtual machines by securing input/output operations between a virtual machine and a device, in accordance with embodiments of the present disclosure. As shown in FIG. 5, the process 500 begins by the secure IOMMU 105 receiving an I/O transaction 165 from an I/O device 160. This is illustrated at step 510. The I/O transaction 165 can include virtual function information, a bus device function, or BDF, and the virtual address location of the memory being accessed. The I/O transaction information can be transmitted to the memory controller 110 that can translate the BDF and the virtual memory address into a physical memory address of where the memory is physically located in physical memory 170.

The memory controller 110 associates the I/O transaction 165 with a key slot associated with the virtual machine the I/O device is communicating with. This is illustrated at step 520. Additionally, the I/O transaction 165 can include a key slot associated with the virtual machine 150 the I/O device 160 is communicating with. The I/O transaction 165 can include a key slot associated with the virtual machine 150 that the I/O device 160 is communicating with. The key slot acts as an identifier for the virtual machine 150. The key slot, as an identifier, can also be a virtual machine identifier, a partition identifier, a universal unique identifier (UUID), and the like.

Using the key slot, the memory controller 110 references the key slot mapping table 120 to retrieve the encryption key used by the virtual machine 150. This is illustrated at step 530. In some embodiments, the encryption key is stored in a key store that is maintained only accessible by the secure IOMMU 105. Additionally, the memory controller 110 can retrieve the physical memory reference by the virtual memory address in the I/O transaction. This is illustrated at step 540. The memory stored by the virtual machine 150 can be encrypted and can require decryption prior to transmission back to the I/O device 160 that generated the I/O transaction.

The crypto engine applies the encryption key to the memory to generate decrypted memory. This is illustrated at step 550. Once decrypted, the decrypted memory is transmitted to the I/O device. This is illustrated at step 560.

Figure 6:
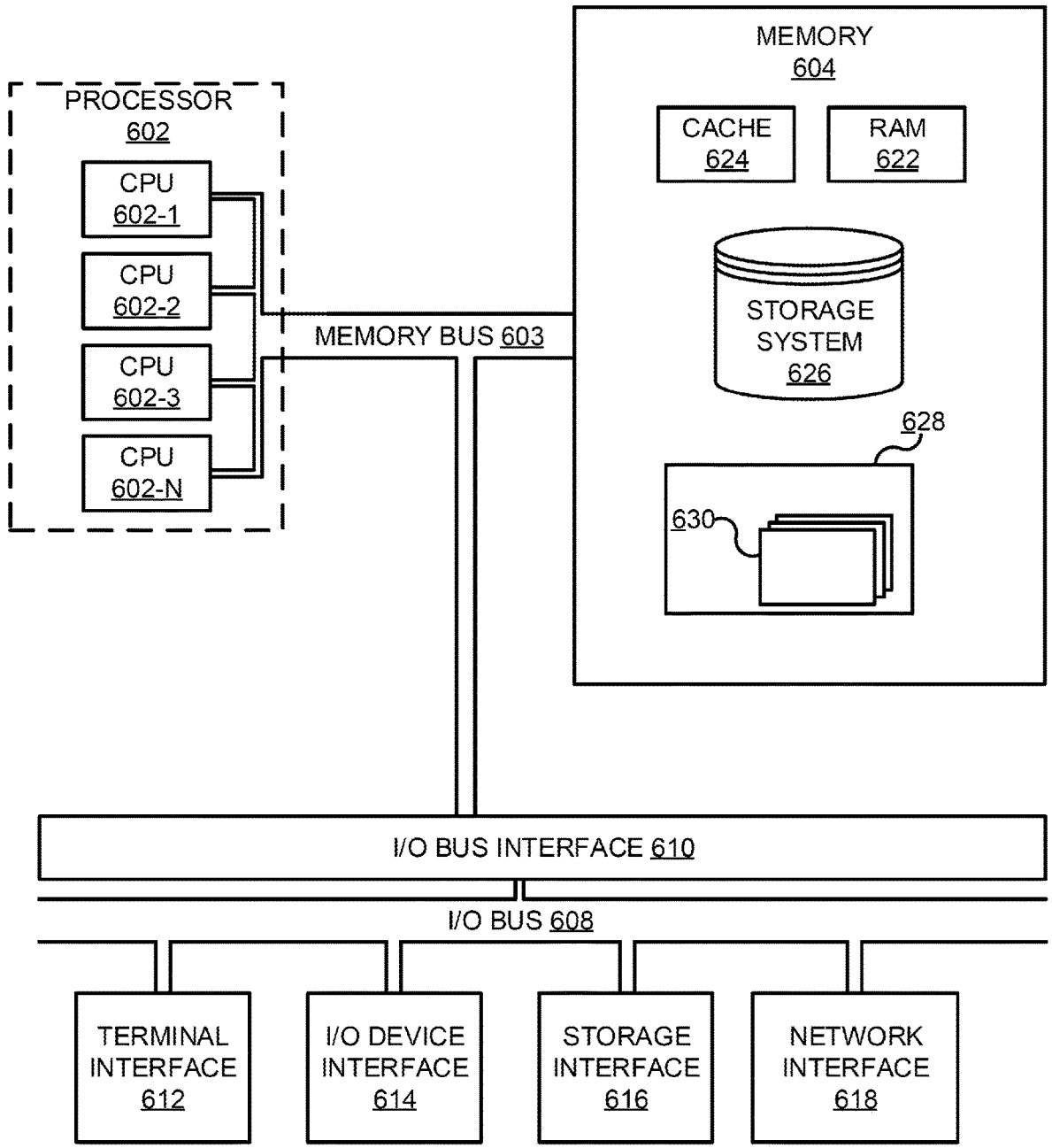
FIG. 6 is a high-level block diagram illustrating an example computer system that may be used in implementing one or more of the methods, tools, and modules, and any related functions, described herein in which the disclosure may be implemented.

Referring now to FIG. 6, shown is a high-level block diagram of an example computer system 600 (e.g., the virtualization computing environment 100) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 600 may comprise one or more processors 602, a memory 604, a terminal interface 612, an I/O (Input/Output) device interface 614, a storage interface 616, and a network interface 618, all of which may be communicatively coupled, directly or indirectly, for inter-component communication via a memory bus 603, an I/O bus 608, and an I/O bus interface 610.

The computer system 600 may contain one or more general-purpose programmable central processing units (CPUs) 602-1, 602-2, 602-3, and 602-N, herein generically referred to as the processor 602. In some embodiments, the computer system 600 may contain multiple processors typical of a relatively large system; however, in other embodiments, the computer system 600 may alternatively be a single CPU system. Each processor 602 may execute instructions stored in the memory 604 and may include one or more levels of onboard cache.

The memory 604 may include computer system readable media in the form of volatile memory, such as random-access memory (RAM) 622 or cache memory 624. Computer system 600 may further include other removable/non-removable, volatile/non-volatile computer system storage media. By way of example only, storage system 626 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, the memory 604 can include flash memory, e.g., a flash memory stick drive or a flash drive. Memory devices can be connected to memory bus 603 by one or more data media interfaces. The memory 604 may include at least one program product having a set (e.g., at least one) of program modules that are configured to carry out the functions of various embodiments.

Although the memory bus 603 is shown in FIG. 6 as a single bus structure providing a direct communication path among the processors 602, the memory 604, and the I/O bus interface 610, the memory bus 603 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 600 may, in some embodiments, contain multiple I/O bus interface units, multiple I/O buses, or both. Further, while multiple I/O interface units are shown, which separate the I/O bus 608 from various communications paths running to the various I/O devices, in other embodiments, some or all of the I/O devices may be connected directly to one or more system I/O buses.

In some embodiments, the computer system 600 may be a multi-user mainframe computer system, a single-user system, or a server computer or similar device that has little or no direct user interface but receives requests from other computer systems (clients). Further, in some embodiments, the computer system 600 may be implemented as a desktop computer, portable computer, laptop or notebook computer, tablet computer, pocket computer, telephone, smartphone, network switches or routers, or any other appropriate type of electronic device.

It is noted that FIG. 6 is intended to depict the major representative components of an exemplary computer system 600. In some embodiments, however, individual components may have greater or lesser complexity than as represented in FIG. 6, components other than or in addition to those shown in FIG. 6 may be present, and the number, type, and configuration of such components may vary.

One or more programs/utilities 628, each having at least one set of program modules 630 (e.g., the virtualization computing environment 100), may be stored in memory 604. The programs/utilities 628 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 628 and/or program modules 630 generally perform the functions or methodologies of various embodiments.

It is to be understood that although this disclosure includes a detailed description on cloud computing, implementation of the teachings recited herein is not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-guest model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Figure 7:
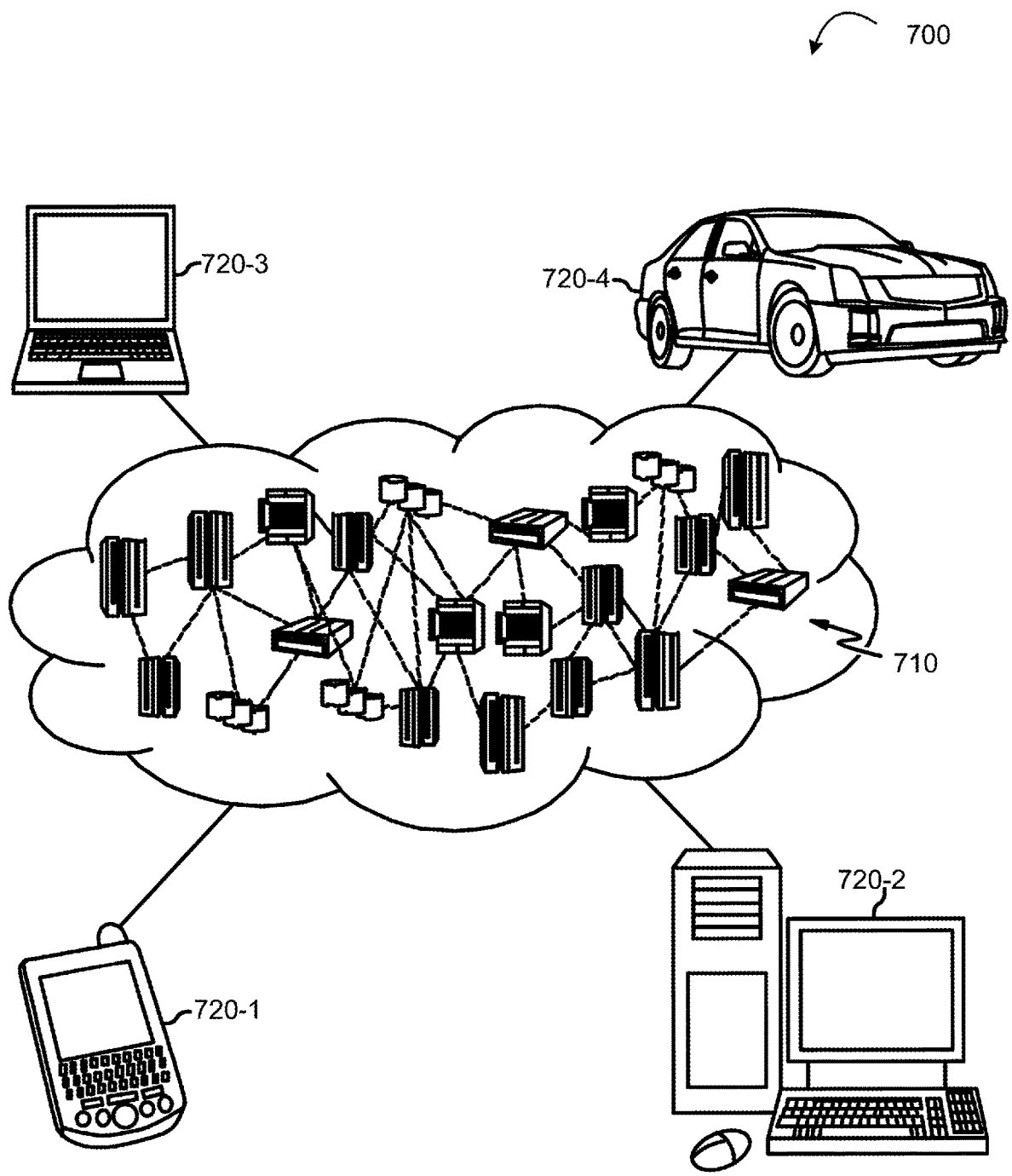
FIG. 7 depicts a cloud computing environment in accordance with embodiments of the present disclosure.

Referring now to FIG. 7, illustrative cloud computing environment 700 is depicted. As shown, cloud computing environment 700 includes one or more cloud computing nodes 710 with which local computing devices used by cloud consumers, such as, for example, personal digital assistant (P.D.A.) or cellular telephone 720-1, desktop computer 720-2, laptop computer 720-3, and/or automobile computer system 720-4 may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 700 to offer infrastructure, platforms and/or software as services for which a cloud consumer does not need to maintain resources on a local computing device. It is understood that the types of computing devices 720-1 to 720-4 shown in FIG. 7 are intended to be illustrative only and that computing nodes 710 and cloud computing environment 700 can communicate with any type of computerized device over any type of network and/or network addressable connection (e.g., using a web browser).

Figure 8:
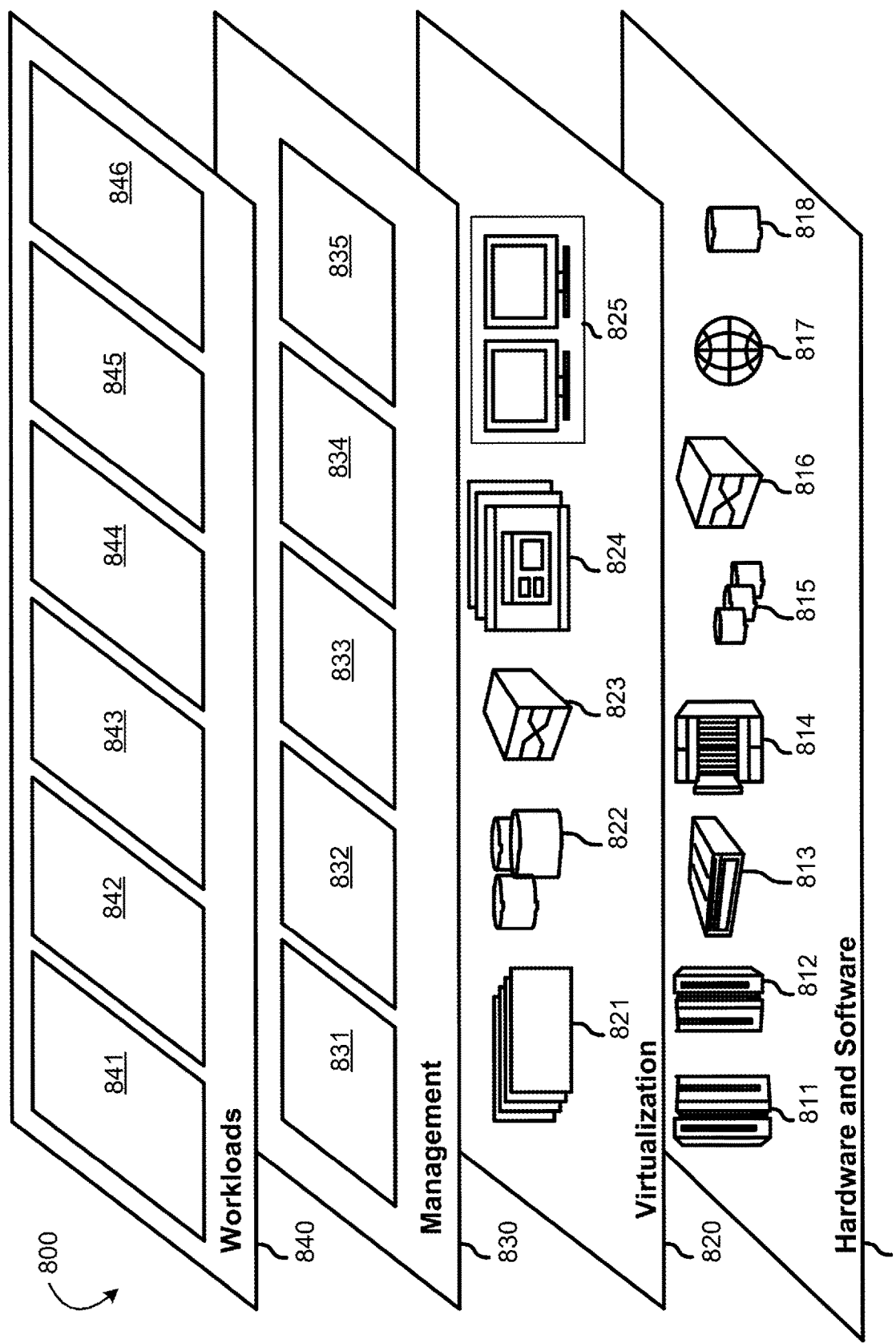
FIG. 8 depicts abstraction model layers in accordance with embodiments of the present disclosure.

Referring now to FIG. 8, a set of functional abstraction layers 800 provided by cloud computing environment 700 (FIG. 7) is shown. It should be understood in advance that the components, layers, and functions shown in FIG. 8 are intended to be illustrative only and embodiments of the disclosure are not limited thereto. As depicted, the following layers and corresponding functions are provided:

Hardware and software layer 810 includes hardware and software components. Examples of hardware components include mainframes 811; RISC (Reduced Instruction Set Computer) architecture-based servers 812; servers 813; blade servers 814; storage devices 815; and networks and networking components 816. In some embodiments, software components include network application server software 817 and database software 818.

Virtualization layer 820 provides an abstraction layer from which the following examples of virtual entities may be provided: virtual servers 821; virtual storage 822; virtual networks 823, including virtual private networks; virtual applications and operating systems 824; and virtual clients 825.

In one example, management layer 830 may provide the functions described below. Resource provisioning 831 provides dynamic procurement of computing resources and other resources that are utilized to perform tasks within the cloud computing environment. Metering and Pricing 832 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 833 provides access to the cloud computing environment for consumers and system administrators. Service level management 834 provides cloud computing resource allocation and management such that required service levels are met. Service Level Agreement (SLA) planning and fulfillment 835 provide pre-arrangement for, and procurement of, cloud computing resources for which a future requirement is anticipated in accordance with an SLA.

Workloads layer 840 provides examples of functionality for which the cloud computing environment may be utilized. Examples of workloads and functions which may be provided from this layer include mapping and navigation 841; software development and lifecycle management 842; virtual classroom education delivery 843; data analytics processing 844; transaction processing 845, and a virtualization computing environment 846.

The present disclosure may be a system, a method, and/or a computer program product at any possible technical detail level of integration. The computer program product may include a computer-readable storage medium (or media) having computer readable instructions thereon for causing a processor to carry out aspects of the present disclosure.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable instructions from the network and forwards the computer readable instructions for storage in a computer readable storage medium within the respective computing/processing device.

Computer readable instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable instructions by utilizing state information of the computer readable instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable instructions.

These computer readable instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But the various embodiments may be practiced without these specific details. In other instances, well-known circuits, structures, and techniques have not been shown in detail in order not to obscure embodiments.

When different reference numbers comprise a common number followed by differing letters (e.g., 100*a*, 100*b*, 100*c*) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

It should first be appreciated that throughout this description the term "mechanism" is used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   receiving an input/output (I/O) transaction from an I/O device requesting data stored in memory from a virtual machine, wherein the I/O transaction includes a virtual memory address and a bus device function;
   associating the I/O transaction with a key slot identifying the virtual machine based upon the virtual memory address and the bus device function;
   retrieving, using the key slot, an encryption key used to encrypt and decrypt the data;
   retrieving the data located at a physical memory address in physical memory relating to the virtual memory address of the data being requested;
   decrypting, during a read operation, the data using the encryption key for I/O transmission; and
   transmitting the decrypted data to the I/O device.

2. The method of claim 1, further comprising:
   encrypting, during a write operation, the data using the encryption key for I/O transmission; and
   storing the encrypted data in the physical memory.

3. The method of claim 1, wherein a key slot mapping table is used to associate the I/O transaction with the key slot of the virtual machine.

4. The method of claim 2, wherein the key slot mapping table includes a mapping between the bus device function and the key slot.

5. The method of claim 1, wherein the key slot is stored in a memory entry of a memory lookup table used to translate the virtual memory address into a physical memory address.

6. The method of claim 5, wherein a virtual I/O memory management unit (vIOMMU) is associated with the virtual machine that decrypts the data from the physical memory address prior to transmission to the I/O device.

7. The method of claim 5, wherein the key slot corresponding to the physical memory address is returned when a translation occurs.

8. The method of claim 1, wherein the I/O device is a single-root I/O virtualization (SRIOV) device capable of direct memory access I/O transactions with the virtual machine.

9. The method of claim 1, wherein the virtual machine is a container in a cloud computing environment.

10. A computer program product comprising a computer readable storage medium having a computer readable instructions stored therein, wherein the computer readable instruction, when executed on a computing device, causes the computing device to:
    receive an input/output (I/O) transaction from an I/O device requesting data stored in memory from a virtual machine, wherein the I/O transaction includes a virtual memory address and a bus device function;

associate the I/O transaction with a key slot identifying the virtual machine based upon the virtual memory address and the bus device function;

retrieve, using the key slot, an encryption key used to encrypt and decrypt the data;

retrieve the data located at a physical memory address in physical memory relating to the virtual memory address of the data being requested;

decrypt, during a read operation, the data using the encryption key for I/O transmission; and transmit the decrypted data to the I/O device.

11. The computer program product of claim 10, further comprising instructions to:

encrypt, during a write operation, the data using the encryption key for I/O transmission; and store the encrypted data in the physical memory.

12. The computer program product of claim 10, wherein a key slot mapping table is used to associate the I/O transaction with the key slot of the virtual machine.

13. The computer program product of claim 11, wherein the key slot mapping table includes a mapping between the bus device function and the key slot.

14. The computer program product of claim 10, wherein the key slot is stored in a memory entry of a memory lookup table used to translate the virtual memory address into a physical memory address.

15. The computer program product of claim 13, wherein a virtual I/O memory management unit (vIOMMU) is associated with the virtual machine that decrypts the data from the physical memory address prior to transmission to the I/O device.

16. The computer program product of claim 13, wherein the key slot corresponding to the physical memory address is returned when a translation occurs.

17. The computer program product of claim 10, wherein the I/O device is a single-root I/O virtualization (SRIOV) device capable of direct memory access I/O transactions with the virtual machine.

18. An apparatus comprising:

a processor; and a memory coupled to the processor, wherein the memory comprises instructions which, when executed by the processor, cause the processor to:

receive an input/output (I/O) transaction from an I/O device requesting data stored in memory from a virtual machine, wherein the I/O transaction includes a virtual memory address and a bus device function;

associate the I/O transaction with a key slot identifying the virtual machine based upon the virtual memory address and the bus device function;

retrieve, using the key slot, an encryption key used to encrypt and decrypt the data;

retrieve the data located at a physical memory address in physical memory relating to the virtual memory address of the data being requested;

decrypt, during a read operation, the data using the encryption key for I/O transmission; and transmit the decrypted data to the I/O device.

19. The apparatus of claim 18, wherein a key slot mapping table is used to associate the I/O transaction with the key slot of the virtual machine.

20. The apparatus of claim 19, wherein the key slot mapping table includes a mapping between the bus device function and the key slot.

* * * * *